(12) United States Patent
Duborgel

(10) Patent No.: US 6,925,480 B2
(45) Date of Patent: *Aug. 2, 2005

(54) MICROARCHITECTURE OF AN ARITHMETIC UNIT

(75) Inventor: Olivier Duborgel, Meylan (FR)

(73) Assignee: STMicroelectronics SA, Montrouge (FR)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 600 days.

(21) Appl. No.: 10/035,033

(22) Filed: Dec. 28, 2001

(65) Prior Publication Data

US 2002/0143837 A1 Oct. 3, 2002

(30) Foreign Application Priority Data

Dec. 28, 2000 (FR) .............................................. 00 17240

(51) Int. Cl.[7] ................................................. G06F 7/50
(52) U.S. Cl. ..................................... 708/523; 708/709
(58) Field of Search ................................. 708/501, 523, 708/706, 708, 709

(56) References Cited

U.S. PATENT DOCUMENTS 6,415,311 B1 * 7/2002 Purcell et al. ............... 708/629
6,519,621 B1 * 2/2003 Yano ........................... 708/603
6,542,915 B1 * 4/2003 Dibrino et al. .............. 708/501

OTHER PUBLICATIONS

"Low Cost Overflow Generation Device for a Multiplier–Accumulator" published by IMB Technical Disclosure Bulletin, New York; vol. 28, No. 5 dated Oct. 1, 1985; pp. 1976–1977, XP000715017.

Kai–Ping Yiu; "On Sign Bit Assignment for a Vector Multiplier"; by proceedings of the IEEE, New York; vol. 64, No. 3 dated Mar. 1976; pp. 372–373; XP–002179148.

Kunitoshi Aono et al.; "Image Processor with a Reconfigurable Pipeline Architecture" proceedings of the Custom Integrated Circuits Conference, San Diego, May 15–18, 1989; New York, IEEE, US; vol. Conf. 11 dated May 15, 1989; pp. 2441–2444; XP000075588.

* cited by examiner

Primary Examiner—D. H. Malzahn
(74) Attorney, Agent, or Firm—Lisa K. Jorgenson; Allen, Dyer, Doppelt, Milbrath & Gilchrist, P.A.

(57) ABSTRACT

The microarchitecture of the arithmetic unit includes two cascaded N bit adders to provide an N bits result in an accumulator. The arithmetic unit also includes a carry save adder, followed by an adder, which, along with the accumulator, are extended to N+1 bits. A circuit for determining the output carry value associated with the result is also provided.

27 Claims, 3 Drawing Sheets

MICROARCHITECTURE OF AN ARITHMETIC UNIT

FIELD OF THE INVENTION

The present invention relates to the field of arithmetic units, and, more particularly, to the microarchitecture of arithmetic units.

BACKGROUND OF THE INVENTION

Arithmetic units are used especially in programmable integrated circuits such as microprocessors or microcontrollers. They can be used to carry out a number of arithmetic operations on operands. A well-known field of application is digital signal processing, to apply filters, transfer functions, transforms etc.

One arithmetic operation, commonly used for the different processing operations, is known as the multiplication-accumulation operation in which a sum of products is computed. If two input operands are called A and B and the contents of an accumulator are called Y, this operation is used to compute: RES=A×B+Y. This arithmetic operation conventionally requires an accumulator to contain the new result RES, which will be used at the next iteration, a multiplier to which the two input operands A and B are applied and an adder that receives, at input, the result of the multiplication A×B and the current contents Y of the accumulator. In practice, the current contents of the accumulator are transferred to the adder via a register. The result of the operation is itself transferred into the accumulator.

A known multiplier structure comprises a multiplication stage to compute the partial products P1 and P2 of two input operands A and B, and an adder stage to compute the sum of the partial products P1 and P2. At output, the result of the product of the input operands: A×B=P1+P2, is obtained. This multiplication technique is well known to those skilled in the art.

A microarchitecture for an arithmetic unit that performs multiplication-accumulation operations and uses a multiplier of this kind also includes two cascaded adders. According to the usual meaning given to it in the field considered, the terms "adder" or "full adder" must be understood as a circuit that gives the result of the sum of two operands applied at input. An adder of this kind may, for example, be a carry look-ahead adder or a carry propagation adder.

The first adder computes the sum of the partial products. The second adder adds the current contents of the accumulator to this sum and gives the final result at output. This final result corresponds to the multiplication-accumulation operation. This result is then loaded into the accumulator. The second adder also gives an output carry bit corresponding to the output carry value whose rank corresponds to the most significant bit of the result. In one example, with operands in the two's complement signed format and a 40-bit adder, the result has a signed format on 40 bits, including one sign bit ranked 39, and 39 significant bits ranked 38 to 0, the rank of the most significant bit being the rank 38. The output carry value will thus be referenced $C_{39}$.

This output carry value $C_{39}$ or its complementary value referenced $B_{39}$ is usually stored in a state register. This state register has a certain number of flag bits used by programmers in logic equations proper to the architecture considered.

One problem of the microarchitecture that has just been described is that the two cascaded adders provide a non-optimized computation time which is especially disadvantageous as the operands to be processed are encoded on many bits. With two cascaded adders, the data path is particularly lengthy.

A microarchitecture for an arithmetic unit that is improved in terms of data path uses a carry save adder circuit or CSA. This carry save adder makes two outputs correspond to three inputs. The total time for computing the result is then equal to the time needed to compute a single bit. This carry save adder circuit is followed by an adder that gives the final result. Thus, there is a savings in the computation time of an adder. This savings is equal to the computation time of on adder minus the computation time of the CSA adder.

In this microarchitecture, the carry save adder circuit thus receives the two partial products P1 and P2 and the current contents Y of the accumulator at input. At output, it gives a "carry" vector and a "result" vector. These two vectors are applied as inputs to the adder which gives the result RES at output.

One problem related to this improved microarchitecture is that the output carry information from the adder which gives the result at output is not equal to the result obtained in the first microarchitecture described, with two cascaded adders. This can be understood when we consider the fact that the two inputs of the adder which gives the result and the output carry are not the same in both microarchitectures: in the first architecture, one of the two inputs of this adder receives the sum of the partial products while the other input receives the current contents of the accumulator. In the improved microarchitecture, it is the two carry and result vectors that are given by the carry save adder. Now, each output bit of the adder that gives the final result is prepared from bits applied to the input of the adder and from internally generated carry values. The output carry value is none other than the last internally generated carry value. It will be understood that the same result can be obtained at output of the adder, but with a different output carry value that will be referenced $C_{39'}$. This carry value may be called a "compressed carry value".

To illustrate this problem, let us take the example of the operands, $E_1$, $E_2$, Y, expressed in a four-bit two's complement representation.

$E_1 = 1\ 1\ 1\ 0|_2 = -2|_{10}$ $E_2 = 0\ 0\ 0\ 1|_2 = 1|_{10}$ $Y = 1\ 1\ 1\ 0|_2 = -2|_{10}$

We have an adder N=4 bits. The output carry value is the carry ranked N−1=3, referenced $C_3$. Determining of the output carry value $C_3$ given by the second adder of the standard microarchitecture (2 cascaded adders):

| | | | | | |
|---|---|---|---|---|---|
| $E_1$ | 1 | 1 | 1 | 0 | |
| $E_2$ | 0 | 0 | 0 | 1 | |
| TMP | $1^1$ | $1^1$ | 1 | 1 | Result of the first adder |
| Y | 1 | 1 | 1 | 0 | |
| RES | 1 | 1 | 0 | 1 | Result of the second adder |
| $C_3$ | 1 | | | | With output carry value |

Determining the compressed output carry value $C'_3$ given by the adder which gives the final result in the improved microarchitecture (CSA adder and cascaded adder):

| | | | | | |
|---|---|---|---|---|---|
| $E_1$ | 1 | 1 | 1 | 0 | |
| $E_2$ | 0 | 0 | 0 | 1 | |
| Y | 1 | 1 | 1 | 0 | |
| Σ | 0 | 0 | 0 | 1 | CSA adder: Result Vector |
| R | 1 | 1 | 0 | . | and Carry Vector |
| RES | 1 | 1 | 0 | 1 | Final adder result |
| $C'_3$ | 0 | | | | and compressed output carry value |

It can be seen in this example that the compressed output carry value $C'_3$ does not correspond to the output carry value $C_3$. Thus, the compressed output carry value does not correspond to the definition of the corresponding flag bit in the state register.

SUMMARY OF THE INVENTION

An object of the invention is the improvement of a microarchitecture for an arithmetic unit so that the improved microarchitecture is equivalent to the standard microarchitecture. In particular, the new microarchitecture must give the same flag bits as the state register so that the use of these flag bits by a program is independent of the microarchitecture that is actually implemented.

One approach to this technical problem has been found in the invention by determining the value of the output carry considered from logic equations defined with reference to the initial microarchitecture. For this determination, the final adder and the accumulator have been extended from N to N+1 to determine the value of the output carry $C_{N-1}$ from the most significant bits ranked N of the result at output of the final adder and from the current contents of the accumulator. The use of a final adder and an accumulator extended to N+1 bits in the microarchitecture then makes these bits directly available, these bits being the same in both microarchitectures and it being possible, through these bits, to recompute the value of the output carry value corresponding to the first microarchitecture.

This output carry is also a function of the most significant bit of the sum of the partial products. This sum is not known by the cascade structure of the adder CSA with an adder that gives the final result.

According to the invention, there is therefore provided an adder circuit to compute the sum of the partial products. The structure of this adder is immaterial and may be optimized in terms of circuitry and data path, since only the most significant bit is used at output. It can be shown that, in terms of circuitry, this additional adder takes up less than 1% of the circuitry of the arithmetic unit.

Finally, a combinatorial circuit is provided to appropriately combine the different bits used to determine the value of the output carry value. More generally, the arithmetic unit can implement other arithmetic operations using the cascade structure of the carry save adder and the final adder for accumulation-type operations. Indeed, this cascade structure is used to compute a result RES at output, corresponding to the sum of at least one input operand that is any operand with the current contents of the accumulator. Since the CSA adder has three inputs, one of the inputs can be set at zero.

For example, in a particular application used to carry out double-precision accumulation of numbers, it is sought to compute the sum of the result of a concatenation of two other operands and the current contents of the accumulator. In this case, the output carry bit may be determined by making direct use of the most significant bit of the concatenation number, in combination with the most significant bits of the result at output of the final adder and of the current contents of the accumulator.

The invention therefore pertains to a microarchitecture for an arithmetic unit, the arithmetic unit being defined to give a result on N bits ranked 0 to N−1 of an addition of at least two operands, and one corresponding output carry bit. The microarchitecture comprising a carry save adder to give two output vectors from at least two input operands, one of the operands corresponding to the current contents of an accumulator and a final adder receiving the vectors at input and giving a corresponding result at output. In the microarchitecture, the carry save adder, the final adder and the accumulator are N+1 bit circuits, to apply the most significant N ranked bit of the result given by the final adder and the most significant N ranked bit of the operand corresponding to the current contents of the accumulator to a circuit for determining said output carry bit.

BRIEF DESCRIPTION OF THE DRAWINGS

Other features and advantages of the invention are described in detail in the following description, made by way of a non-restrictive indication, with reference to the appended drawings, of which.

DETAILED DESCRIPTION OF THE PREFERRED EMBODIMENTS

Figure 1:
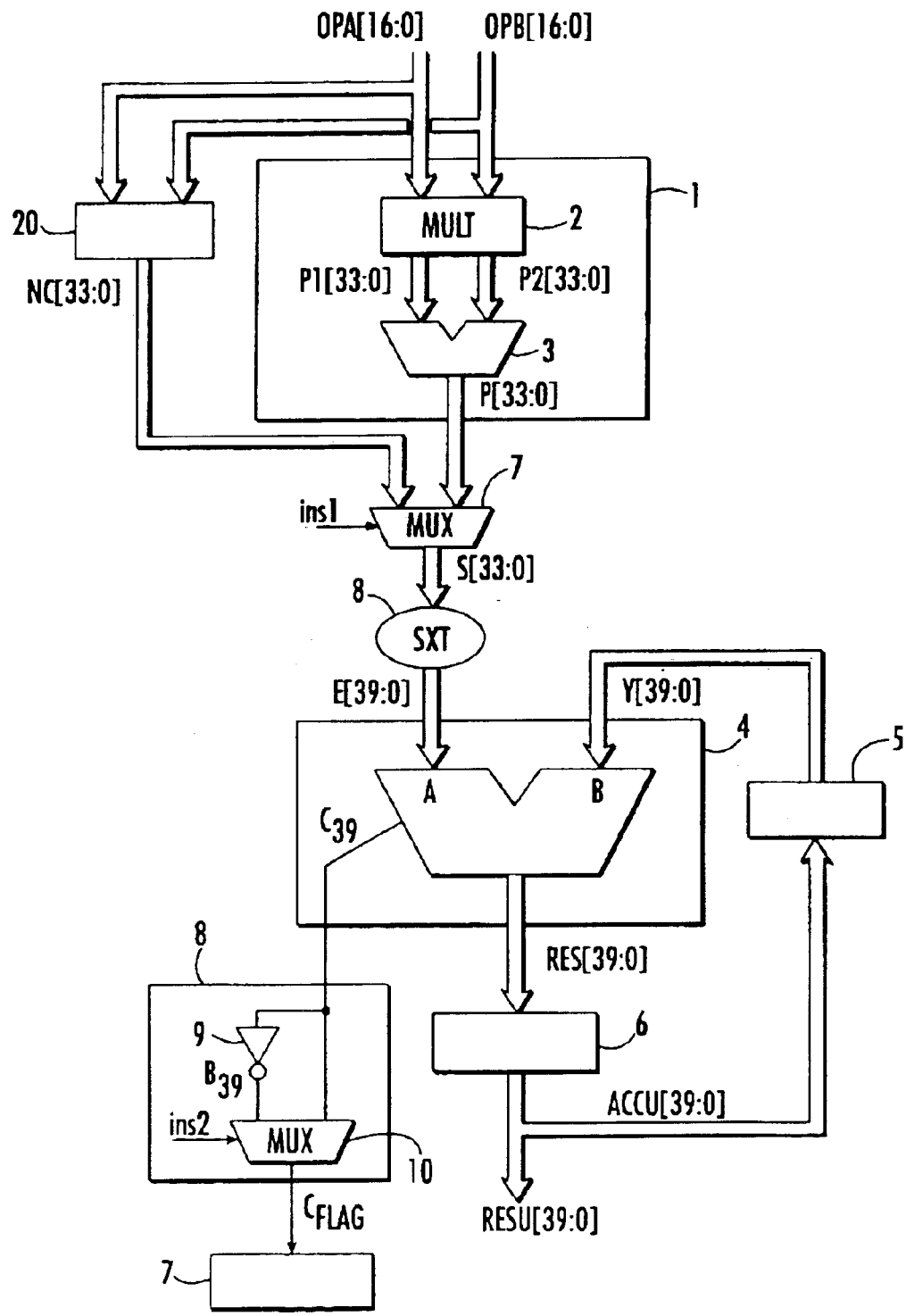
FIG. 1 is a schematic diagram showing a conventional microarchitecture of an arithmetic unit with two cascaded adders.

FIG. 1 shows a conventional arithmetic unit used especially to carry out multiplication-accumulation operations. In the example, it can also be used to carry out operations of accumulation of double precision numbers via the concatenation circuit. In this microarchitecture, the arithmetic unit has a multiplier 1 with two operands OPA, OPB applied to the inputs of the arithmetic unit. This multiplier has a circuit 2 for the computation of the partial products P1 and P2 of the input operands followed by an adder 3 that outputs the result P of this multiplication, the format of this result being double the format of the input operands.

In the example, this arithmetic unit also has a concatenation circuit 20 for the concatenation of the two input operands OPA and OPB. It outputs a concatenated number NC, whose format is twice the format of the input operands. Either of these results P or NC is applied to a first input A of an adder 4. The other input B of the adder receives the contents Y of the shift register 5. This register 5 receives the current contents ACCU of the accumulator 6 at the start of the operation. The result RES is given at output of the adder 4 and transferred to the accumulator 6 to form the new current contents of this accumulator. The new contents will be used for the next iteration. The contents of the accumulator, seen from the general architecture of the circuit, and accessible to a programmer, are referenced RESU and correspond to the contents ACCU. of the accumulator 6.

In practice, the format of the adder 4, the accumulator 6 and the associated register 5 is greater than the format of the results P and NC. Hence, these results are first of all extended before being applied to the adder. The example is particularly concerned with a two's complement signed format. Hence, the format extension is an extension of the sign.

The arithmetic unit also has a multiplexer MUX 7 to apply either the result P or the result NC to the input A of the adder 4, as a function of the operation to be performed, followed by a circuit for the extension of the sign bit SXT 8, to put the selected result in the format of the adder. The multiplexer 7 is thus controlled by a logic signal insl as a function of the operation to be performed, either a multiplication-accumulation or a double-precision accumulation, to select either one of the input channels of the multiplexer. The adder 4 gives a carry bit which is the output carry value of the stage for preparing the most significant bit of the result. In the example, the adder 4 is a 40-bit adder giving a result RES on 40 bits. In the two's complement signed format, there is thus one signed bit RES[39] ranked 39 and 39 significant bits RES[38: 0] ranked 38 to 0, the most significant bit being the rank 38 bit. Thus, the output carry value of this adder is referenced $C_{39}$.

In general, in an N-bit adder giving a result RES[N−1:0], the output carry value is referenced $C_{N-1}$. This output carry value given by the adder 4 is usually stored in the state register 7. This is done via a logic circuit 8 comprising an inverter 9 and a multiplexer 10. The inverter 9 gives the complementary bit $B_{39}$ of the output carry bit $C_{39}$. The multiplexer 10 sends TO the state register 7 a flag bit $C_{Flag}$ equal to the carry bit $C_{39}$ or the borrow bit $B_{39}$ depending on whether the arithmetic operation performed with the accumulator is an addition (P+ACCU) or a subtraction (P−ACCU of ACCU−P). In the former case, there is a positive carry value. In the latter case, there is a negative carry value.

In the example shown in FIG. 1, two's complement signed format operands are considered. The operands OPA, OPB applied to the input of the arithmetic unit have a 17-bit signed format: one signed bit (rank 16) and 16 significant bits (ranked 15 to 0). The results P and NC have a 34-bit signed format.

As for the accumulator 6, the shift register 5 and the adder 4, they are 40-bit circuits. In a known way, the operation of the format extension circuit includes copying the sign bit given by the bit ranked 33 of the operands P or NC and in copying this bit into the higher ranks 34 to 39.

Figure 2:
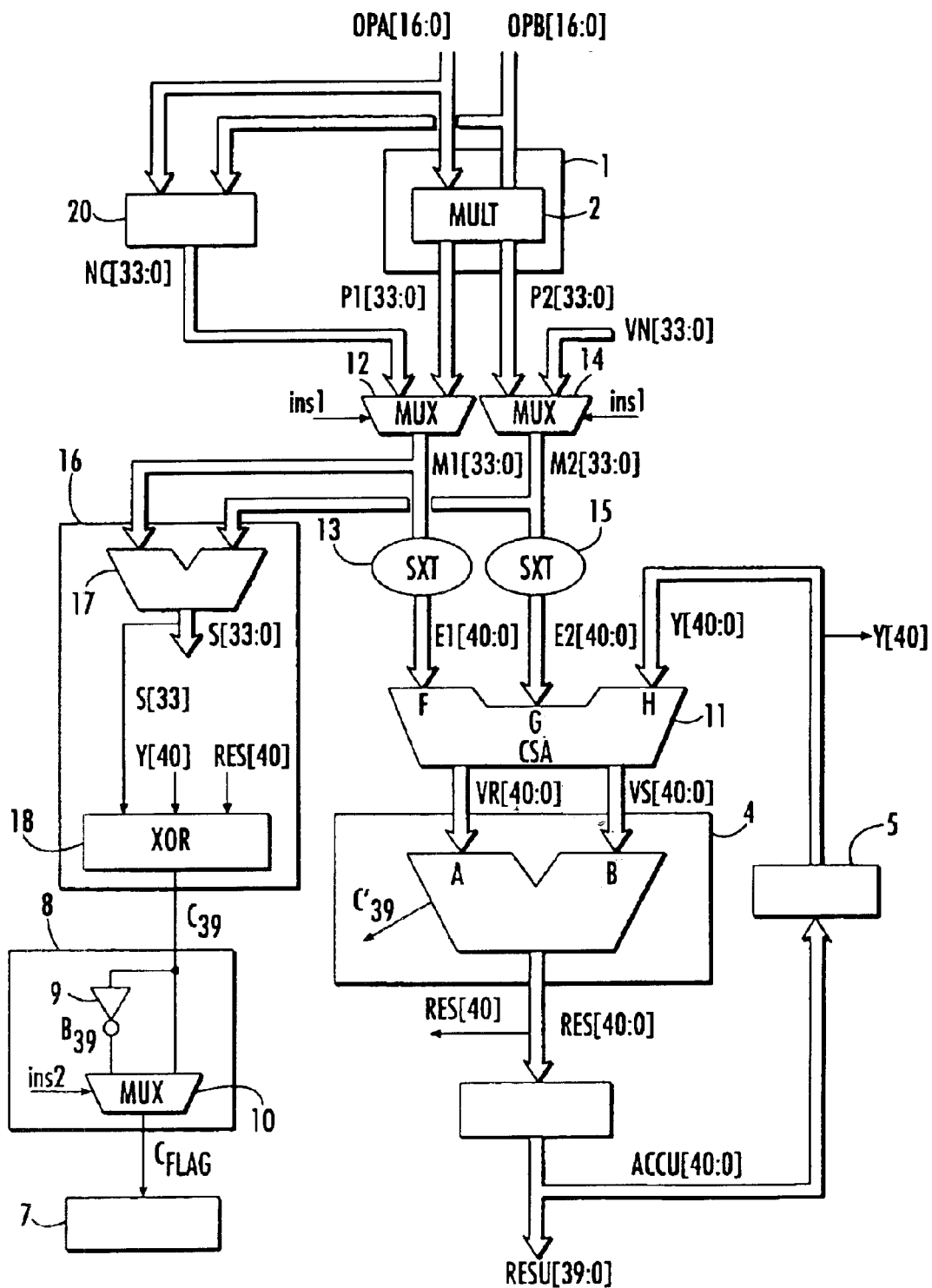
FIG. 2 is a schematic diagram showing an improved microarchitecture of an arithmetic unit with an exemplary embodiment of a circuit for determining the output carry value according to the invention.

A structure of an arithmetic unit of the present invention is shown in FIG. 2. One way to improve a data path comprising cascaded adders is to use carry save adders, and an adder in the last stage of the cascade. When applied to the microarchitecture shown in FIG. 1, the adder 3 is taken out of the multiplier circuit 1 and replaced in FIG. 2 by a carry save adder 11 of the type having three inputs F, G and H towards two outputs.

To obtain operation equivalent to that of the microarchitecture shown in FIG. 1, this adder 11 must enable the computation of the sum of the partial products P1 and P2 and of the contents Y of the register or the sum of the concatenated number NC and of the contents Y of the register, depending on the operation to be performed. Furthermore, the results P1, P2 and NC must always be put into the format of the adder, and therefore undergo a format extension. Two inputs of the adder 11 therefore have a multiplexer and a format extension circuit associated with them while the third input directly receives the contents Y of the register 5 (corresponding to the current contents of the accumulator).

A first input F of the adder is associated with the partial product P1[33:0] and with the concatenated number NC[33:0]. A first multiplexer MUX 12 thus receives the partial product P1 and the concatenated number NC at input and transmits either one of these values to output M1 as a function of the operation in progress, determined by the logic signal ins1. This first multiplexer is followed by a format extension circuit 13 that gives the operand E1 applied to the first input F of the adder 11.

A second input G is associated with the partial product P2[33:0] and with a null vector VN[33:0]. Indeed, in the case of a double precision accumulation operation that performs the operation NC+Y, the second input of the adder 11 is not used. It is therefore set at zero. We thus have a multiplexer MUX 14 that receives the partial product P2 and the zero vector VN at input. It sends either of these values to output M2 as a function of the operation in progress, determined by the logic signal ins1. This multiplexer 14 is followed by a format extension circuit 15 that gives the operand E2 applied to the second input G of the adder 11.

A third input H of the adder 11 receives the operand Y given by the register 5 associated with the accumulator. As a function of the operands E1, E2 and Y, the carry save adder 11 outputs two vectors: a sum vector VS and a carry vector VR. This sum vector VS and carry vector VR are applied to the input of the carry propagation adder 4 which sends the result RES obtained to the accumulator 6.

If the microarchitectures of FIGS. 1 and 2 are compared, it is seen that the carry propagation adder 4 does not have the same inputs in both figures: in the first figure (FIG. 1) its inputs are E and Y; in the second figure (FIG. 2), its inputs are VS and VR.

Since this adder 4 does not have the same inputs in the architecture of FIG. 2, we obtain the same result in the accumulator but the compressed output carry value $C_{39'}$ of the adder 3 is not equal to the output carry value $C_{39}$ of the adder 3 in the microarchitecture shown in FIG. 1. However, it is necessary to send this carry value $C_{39}$, and not the compressed carry value $C_{39}'$, to the state register 7, to enable the arithmetic unit to fulfill the same operation in both microarchitectures. In particular, all the processing operations (overflows, saturation, multiple-precision computation etc.) performed as a function of the flag bit $C_{FLAG}$ stored in the state register 7 should be capable of being conducted in the same way in both microarchitectures.

According to the invention, the microarchitecture shown in FIG. 2 comprises a device for determining the output carry value $C_{39}$. This device is based on an arithmetical determination of the value of this carry value, with respect to the microarchitecture of the arithmetic unit of the FIG. 1, in using operands that can be obtained in the second architecture without requiring any complex circuitry.

In the first architecture, the following are noted:

RES[i] the i ranking bit of the result of the adder 4;

$C_i$ the i ranking internal output carry value;

E[i], the i ranking bit of the first input operand of this adder 4, corresponding either to the (extended) sum of the partial products, or to the result of the concatenation;

Y[i], the i ranking bit of the second input operand of this adder, corresponding to the current contents of the accumulator, given by the register 4;

This can be written as follows:

$$RES[i+1]=E[i+1] \text{ XOR } Y[i+1] \text{ XOR } C_i \qquad \text{(eq1)}$$

And $$C_{i+1}=E[i]\cdot Y[i]+C_i\cdot(E[i] \text{XOR } Y[i]) \quad (eq2)$$

These equations eq1 and eq2 are the general equations of an N-bit adder, with operands on N bits, E[N−1:0] and Y[N−1:0] and one result on N bits RES[N−1:0]. The output carry value of the adder is then the output carry value $C_{N-1}$ having the rank N−1. This output carry value $C_{N-1}$, may be used to compute the rank N in adder extended to N+1 bits. We then have:

$$RES[N]=E[N] \text{XOR } Y[N] \text{XOR } C_{N-1} \quad (eq3)$$

With an N+1=41 bit (N=40) adder as the second adder 4 in the microarchitecture of FIG. 1, the most significant bit RES[40] of the result would be written therefore as follows:

$$RES[40]=E[40] \text{XOR } Y[40] \text{XOR } C_{39} \text{ where:}$$

$$C_{39}=E[40] \text{XOR } Y[40] \text{XOR } RES[40] \quad (eq4)$$

If we refer to FIG. 1, the bit ranked 40 of the operand E is, depending on the logic signal ins1, either equal to the bit ranked 40 of the concatenated number NC, after format extension, which is equivalent to the bit ranked 33 of this number: NC[33]; or equal to the bit ranked 40 of the sum P of the partial products P1 and P2, after format extension, which is equivalent to the bit ranked 33 of this sum: P[33]. More generally, if S[33:0] is the reference given to the operand output by the multiplexer 7 in FIG. 1, the bit ranked 40 of the operand E is equal to the bit ranked 33 of this operand S. The equation eq4 can therefore be written as follows:

$$C_{39}=S[33] \text{XOR } Y[40] \text{XOR } RES[40] \quad (eq5)$$

where S[33] is equal to NC[33] or P[33].

Now the bit NC[33] is known directly. It follows from this that, in the improved architecture shown in FIG. 2, by providing an adder 4 and an accumulator 6 extended to N+1 bits, namely 41 bits in the example, the only unknown quantity in the determination of the output carry value $C_{39}$ is P[33]. In this case, it is also necessary to plan for the CSA adder 11 to be a 41-bit adder. The format extension circuits become 41-bit extension circuits.

Thus, as shown in FIG. 2, the CSA adder 11 receives operands extended to 41 bits, E1[40:0], E2[40:0] and Y[40:0], and gives 41-bit result and sum vectors VR[40:0] and VS[40:0]. These result and sum vectors are applied to the adder 4 which gives a result on 41 bits RES[40:0] that is then transferred into a 41-bit accumulator 6 with an associated 41-bit register 5. To keep the equivalence between the two microarchitectures, it is planned that only the N first bits of the accumulator will be accessible to the programmer in read mode. In other words, $RES_U$=ACCU [39:0].

Several embodiments of a circuit for the determination of the carry bit $C_{39}$ according to the invention are possible, depending on the logic equation eq4 or eq5 used and depending on whether or not the operands to be processed are distinguished on the basis of the operation in progress. In any case, the circuit for determining the output carry value $C_{39}$ comprises a circuit for evaluating the most significant bit of the sum of the operands E1 and E2 applied as inputs to the carry save adder, or of equivalent operands. In practice, depending on the implementation and referring to FIG. 1, it is possible to obtain, at output of this evaluation circuit, either: E[40], or S[33] or P[33].

In a first practical exemplary embodiment of the device for determining the output carry value $C_{39}$ shown in FIG. 2, this determining device 16 comprises a circuit for evaluating the bit S[33], and a logic circuit 18 implementing the logic equation (XOR) between the bits of the equation eq5.

The circuit 17 for evaluating the bit S[33] is based on an adder, to which the outputs M1 and M2 of the multiplexers 12 and 14 are applied at input. A result S[33:0]=M1[33:0]+M2[33:0] is obtained at output. In practice, this adder has a structure limited to the strict minimum needed to output the bit that concerns us, namely the bit S[33]. The structure may be of any type, preferably the most optimized type, in terms of circuitry and data path. It will be noted that it is equally possible to apply the operands E1 and E2 of the carry save adder to the input of this adder, to obtain E[40]. However, the data path is necessarily lengthier. This is not useful in practice.

In practice, it is not the entire structure of this adder that needs to be implemented. Only the elements needed for the evaluation of the 33-ranked bit of the sum must be implemented. The structure used may be optimized in terms of circuitry and data path. Depending on whether the concerned operation is a double-precision accumulation or an operation of multiplication-accumulation, this bit S[33] corresponds in practice to the 33-ranked bit of the number NC, for then M1=NC and M2=VN; or to the 33-ranked bit of the sum P of the partial products, because then M1=P1 and M2=P2.

The XOR type logic circuit 18 of the determining circuit 16 therefore receives, at input, this bit S[33], the 40-ranked bit of the current contents Y of the accumulator, given by the register 5, namely Y[40], and the 40-ranked bit of the result RES at output of the adder, namely RES[40]. At output, it gives the 39-ranked output carry bit, $C_{39}$, applied to the input of the circuit 8, to be stored in the state register 7.

Thus, the arithmetic unit shown in FIG. 2 is improved in terms of data path and therefore speed while, at the same time, giving a full result, equivalent to the conventional microarchitecture with two cascaded adders of FIG. 1. The additional logic needed to evaluate the output carry bit is insignificant as compared with the logic of the full arithmetic unit. The arithmetic unit of the present invention is therefore particularly advantageous, in all the applications in which the data-processing speed is crucial.

Figure 3:
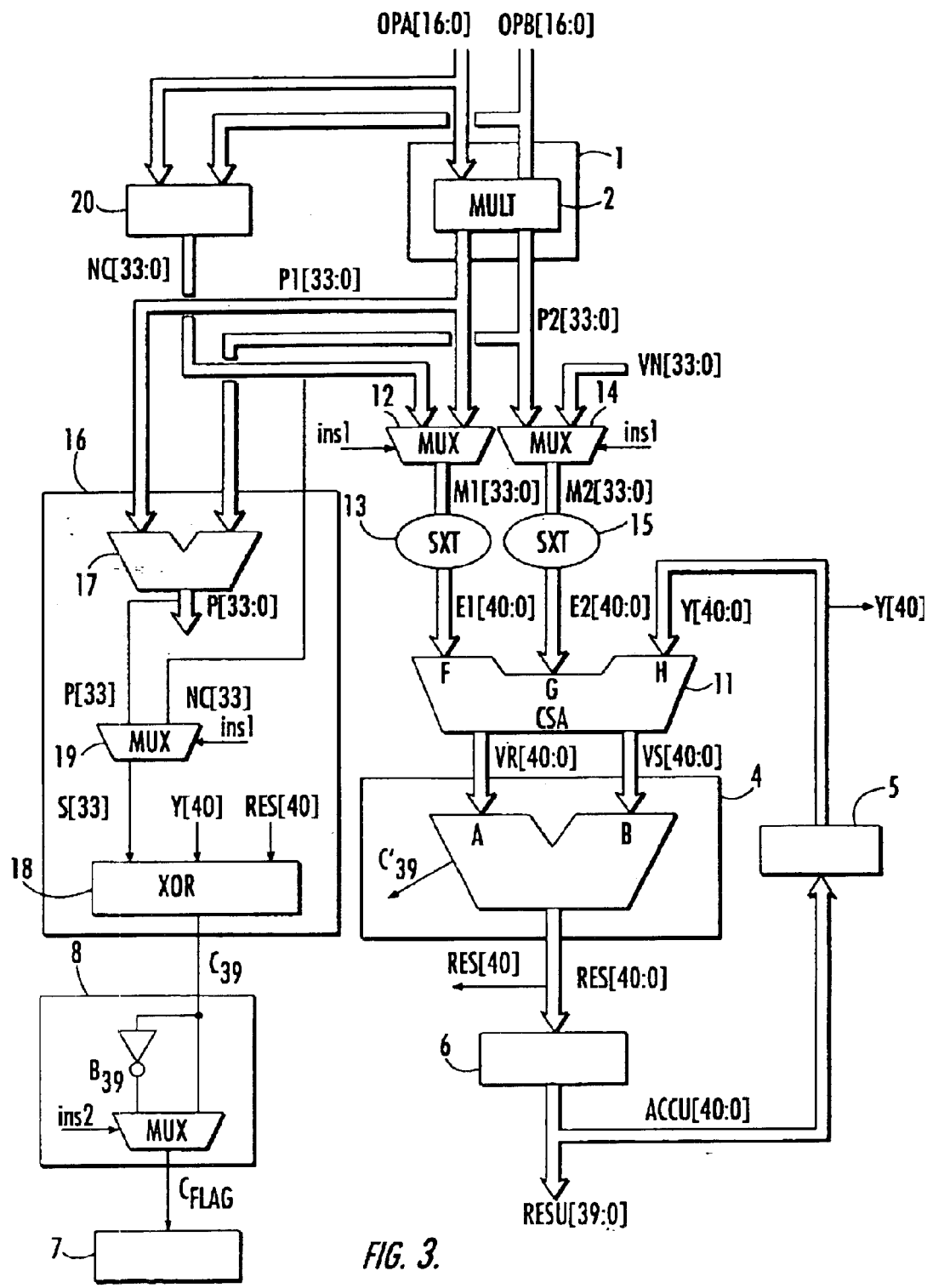
FIG. 3 is a schematic diagram showing an improved microarchitecture of an arithmetic unit with another exemplary embodiment of the circuit for determining the output carry value according to the invention.

FIG. 3 shows an alternative embodiment of the circuit 16 for evaluating the output carry value $C_{39}$. In this alternative embodiment, the operands to be considered for the evaluation of the bit S[33] are singled out as a function of the operation to be performed. We therefore have a more specific structure. In this example, the adder 17 of the circuit for evaluating the bit S[33] receives the partial products P1 and P2 at input; and outputs the resultant sum P, or more precisely the 33-ranked bit of the sum: P[33].

The circuit for evaluating the bit S[33] furthermore comprises a multiplexer 19 which receives, as inputs, this bit P[33] and the 33-ranked bit of the concatenated number NC, namely NC[33]. This multiplexer 19 outputs the bit S[33] applied to the input of the logic circuit 18. This bit is equal either to the bit P[33] or to the bit NC[33] depending on the current operation concerned, determined by the control signal ins1 applied to the multiplexer 19.

Whatever the variant chosen, it requires little circuitry and enables the use of an improved microarchitecture, equivalent to the original microarchitecture so that it can be used in a microprocessor circuit, with full equivalence, in place of this original microarchitecture.

That which is claimed is:

1. A microarchitecture for an arithmetic unit, said arithmetic unit being defined to generate a result of N bits ranked 0 to N−1 of an addition of at least two input operands, and one corresponding output carry bit, said microarchitecture comprising:

an N+1 bit accumulator;

an N+1 bit carry save adder for providing two output vectors from the at least two input operands, one of the operands corresponding to a current contents of the accumulator;

an N+1 bit final adder receiving the output vectors at input and generating a corresponding result at output; and a determining circuit for receiving a most significant bit of the result generated by said final adder and a most significant bit of the operand corresponding to the current contents of the accumulator and determining the output carry bit.

2. A microarchitecture of an arithmetic unit according to claim 1, wherein said carry save adder receives a first operand, a second operand and a third operand as inputs, the third operand corresponding to the current contents of the accumulator; and wherein said determining circuit comprises an evaluation circuit for evaluating a most significant bit of a sum of the first and second input operands.

3. A microarchitecture according to claim 2, wherein said evaluation circuit comprises an adder for generating the most significant bit of the sum of the first and second input operands.

4. A microarchitecture according to claim 2, wherein the determining circuit comprises a logic circuit that outputs the output carry value based upon the most significant bit of the sum of the first and second input operands generated by said evaluation circuit, the N-ranked bit of the current contents of the accumulator and the N-ranked bit of the result generated by the final adder.

5. A microarchitecture according to claim 2, further comprising a multiplier for generating partial products of two operands applied as inputs to the arithmetic unit, wherein the partial products are applied as the first and second input operands of the carry save adder.

6. A microarchitecture according to claim 2, further comprising a concatenation circuit for the concatenation of two operands input to the arithmetic unit, and generating a concatenated number at output, to carry out operations of double precision accumulation with the current contents of the accumulator, the concatenated number being applied as the first input operand of said carry save adder, said second input operand being set at the zero vector.

7. A microarchitecture according to claim 5, further comprising:

a concatenation circuit, connected in parallel with the multiplier, for the concatenation of two operands input to the arithmetic unit, and generating a concatenated number at output, to carry out operations of double precision accumulation with the current contents of the accumulator; and a multiplexer connected to the multiplier and the concatenation circuit for selectively applying either the concatenated number and a zero vector or the partial products as the first and second input operands of the carry save adder.

8. A microarchitecture according to claim 7, wherein the determining circuit comprises a second multiplexer for selectively providing, as an evaluated bit, either the bit generated by the evaluation circuit or the most significant bit of the concatenated number.

9. A microarchitecture according to claim 2, further comprising a format extension circuit for extending the operands applied as first and second input operands of the carry save adder to $N^{+1}$ bits, wherein the evaluation circuit receives the first and second input operands before format extension.

10. A microprocessor comprising:

an arithmetic unit for generating a result of N bits of an addition of at least two input operands, and one corresponding output carry bit, said arithmetic unit comprising an N+1 bit accumulator;

an N+1 bit carry save adder for providing two output vectors from the at least two input operands, one of said operands corresponding to a current contents of the accumulator;

an N+1 bit final adder receiving the output vectors at input and generating a corresponding result at output; and a determining circuit for receiving a most significant bit of the result generated by said final adder and a most significant bit of the operand corresponding to the current contents of the accumulator and determining the output carry bit.

11. A microprocessor according to claim 10 wherein said carry save adder receives a first operand, a second operand and a third operand as inputs, the third operand corresponding to the current contents of the accumulator; and wherein said determining circuit comprises an evaluation circuit for evaluating a most significant bit of a sum of the first and second input operands.

12. A microprocessor according to claim 11, wherein said evaluation circuit comprises an adder for generating the most significant bit of the sum of the first and second input operands.

13. A microprocessor according to claim 11, wherein the determining circuit comprises an exclusive-or type logic circuit that outputs the output carry value based upon the most significant bit of the sum of the first and second input operands generated by said evaluation circuit, an N-ranked bit of the current contents of the accumulator and an N-ranked bit of the result generated by the final adder.

14. A microprocessor according to claim 11, further comprising a multiplier for generating partial products of two operands applied as inputs to the arithmetic unit, wherein the partial products are applied as the first and second input operands of the carry save adder.

15. A microprocessor according to claim 11, further comprising a concatenation circuit for the concatenation of two operands input to the arithmetic unit, and generating a concatenated number at output, to carry out operation of double precision accumulation with the current contents of the accumulator, the concatenated number being applied as the first input operand of said carry save adder, said second input operand being set at the zero vector.

16. A microprocessor according to claim 14, further comprising:

a concatenation circuit, connected in parallel with the multiplier, for the concatenation of two operands input to the arithmetic unit, and generating a concatenated number at output; and a multiplexer connected to the multiplier and the concatenation circuit for selectively applying either the concatenated number and a zero vector or the partial products as the first and second input operands of the carry save adder.

17. A microprocessor according to claim 16, wherein the determining circuit comprises a second multiplexer for selectively providing, as an evaluated bit, either the bit generated by the evaluation circuit or the most significant bit of the concatenated number.

18. A microprocessor according to claim 11, further comprising a format extension circuit for extending the operands applied as first and second input operands of the carry save adder to $N^{+1}$ bits, wherein the evaluation circuit receives the first and second input operand before format extension.

19. A method of generating a result of N bits of an addition of at least two input operands and one corresponding output carry bit with an arithmetic unit, the method comprising:

providing an N+1 bit accumulator;

providing two output vectors from the at least two input operands with an N+1 bit carry save adder, one of the operands corresponding to a current contents of the accumulator;

generating the result at an output of an N+1 bit final adder which receives the output vectors at input; and determining the output carry bit with a determining circuit which receives a most significant bit of the result generated by the final adder and a most significant bit of the operand corresponding to the current contents of the accumulator.

20. A method according to claim 19, wherein said carry save adder receives a first operand, a second operand and a third operand as inputs, the third operand corresponding to the current contents of the accumulator; and wherein said determining circuit comprises an evaluation circuit for evaluating a most significant bit of a sum of the first and second input operands.

21. A method according to claim 20, wherein said evaluation circuit comprises an adder for generating the most significant bit of the sum of the first and second input operands.

22. A method according to claim 20, wherein the determining circuit comprises an exclusive-or type logic circuit that outputs the output carry value based upon the most significant bit of the sum of the first and second input operands generated by said evaluation circuit, the N-ranked bit of the current contents of the accumulator and the N-ranked bit of the result generated by the final adder.

23. A method according to claim 20, further comprising generating partial products of two operands applied as inputs to the arithmetic limit with a multiplier, wherein the partial products are applied as the first and second input operands of the carry save adder.

24. A method according to claim 20, further comprising concatenating two operands input to the arithmetic unit with a concatenation circuit to generate a concatenated number which is applied as the first input operand of said carry save adder, said second input operand being set at the zero vector.

25. A method according to claim 23, further comprising:

concatenating two operands input to the arithmetic unit with a concatenation circuit connected in parallel with the multiplier, to generate a concatenated number; and selectively applying either the concatenated number and a zero vector or the partial products as the first and second input operands of the carry save adder with a multiplier connected to the multiplier and the concatenation circuit.

26. A method according to claim 25, wherein the determining circuit comprises a second multiplexer for selectively providing, as an evaluated bit, either the bit generated by the evaluation circuit or the most significant bit of the concatenated number.

27. A method according to claim 20, further comprising extending the operands applied as first and second input operands of the carry save adder to $N^{+1}$ bits with a format extension circuit, wherein the evaluation circuit receives the first and second input operands before format extension.

* * * * *